(12) United States Patent
Garcia

(10) Patent No.: US 8,262,005 B2
(45) Date of Patent: Sep. 11, 2012

(54) PROCESSING APPARATUS AND METHOD

(75) Inventor: Jorge B. Garcia, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 96 days.

(21) Appl. No.: 12/870,346

(22) Filed: Aug. 27, 2010

(65) Prior Publication Data

US 2011/0210195 A1    Sep. 1, 2011

Related U.S. Application Data

(60) Provisional application No. 61/240,440, filed on Sep. 8, 2009.

(51) Int. Cl.
*B02C 25/00* (2006.01)

(52) U.S. Cl. .................... 241/37.5; 241/282.2

(58) Field of Classification Search .......... 241/36, 241/92, 37.5, 282.1, 282.2
See application file for complete search history.

(56) References Cited

U.S. PATENT DOCUMENTS

| | | | |
|---|---|---|---|
| 4,143,824 A | 3/1979 | Shiotani |
| 4,199,268 A | 4/1980 | Parzych |
| 4,216,917 A | 8/1980 | Clare et al. |
| 4,226,373 A | 10/1980 | Williams |
| 4,316,584 A | 2/1982 | Valbona |
| 4,371,118 A | 2/1983 | Sontheimer et al. |
| 4,396,159 A | 8/1983 | Podell |
| 4,471,915 A | 9/1984 | Levin et al. |
| 4,506,836 A | 3/1985 | Williams |
| 4,512,522 A | 4/1985 | Williams |
| 4,542,857 A | 9/1985 | Akasaka |
| 4,614,306 A | 9/1986 | Doggett |
| 4,629,131 A | 12/1986 | Podell |
| 4,741,482 A | 5/1988 | Coggiola et al. |
| 5,417,152 A | 5/1995 | Harrison |
| 5,495,795 A | 3/1996 | Harrison et al. |
| 5,695,135 A | 12/1997 | Aikawa |
| 5,735,193 A | 4/1998 | Chang |
| 5,921,485 A | 7/1999 | Plavcan et al. |

(Continued)

FOREIGN PATENT DOCUMENTS

DE    2250177    1/1974

(Continued)

OTHER PUBLICATIONS

GE Food Processor Manual, Model No. 169141 (US) (Jul. 28, 2006).

(Continued)

*Primary Examiner* — Faye Francis
(74) *Attorney, Agent, or Firm* — Baker Hostetler LLP

(57) ABSTRACT

A processing apparatus and method includes a housing, including: a motor, and a drive shaft rotatable by a motor about a drive axis, including a drive engagement device movable along the drive axis, a bowl, the drive shaft extending into the bowl when the bowl is secured to the housing in a working position, a bowl lid including a chute, a lid shaft including a lid engagement device axially aligned with the drive shaft when the bowl and bowl lid are in the working position, and a pusher including a pusher engagement portion for causing the lid engagement device to move the drive engagement device into the retracted position when the bowl and bowl lid are in the working position, wherein, when the drive engagement device is in the retracted position, the drive shaft is rotatable by the motor.

30 Claims, 6 Drawing Sheets

U.S. PATENT DOCUMENTS

| | | | |
|---|---|---|---|
| 6,027,242 A | 2/2000 | Thuma | |
| 6,254,019 B1 | 7/2001 | Galbreath | |
| 6,375,102 B1 | 4/2002 | Bouleau et al. | |
| 6,397,735 B1 | 6/2002 | Wong | |
| 6,474,578 B1 | 11/2002 | Gonneaud et al. | |
| 6,510,784 B1 | 1/2003 | Fevre et al. | |
| 6,532,863 B1 | 3/2003 | Lee | |
| 6,609,821 B2 | 8/2003 | Wulf et al. | |
| 6,669,124 B2 | 12/2003 | Lazzer et al. | |
| 6,907,819 B2 | 6/2005 | Kernan | |
| 6,986,475 B2 | 1/2006 | Wanat | |
| 7,028,930 B2 | 4/2006 | Carnevale | |
| 7,069,839 B2 | 7/2006 | Kernan | |
| 7,229,036 B2 | 6/2007 | Carnevale et al. | |
| 7,461,801 B2 | 12/2008 | Chang | |
| 7,520,659 B2 | 4/2009 | Wulf et al. | |
| 7,708,215 B2 * | 5/2010 | Wang | 241/37.5 |
| 2002/0096585 A1 | 7/2002 | Unteregger | |
| 2006/0201341 A1 | 9/2006 | Kernan | |
| 2007/0181720 A1 | 8/2007 | Mauch et al. | |
| 2008/0011763 A1 | 1/2008 | Mauch et al. | |
| 2008/0163767 A1 | 7/2008 | Wu Chang | |

FOREIGN PATENT DOCUMENTS

| | | |
|---|---|---|
| DE | 3335139 A1 | 4/1985 |
| EP | 0127050 A2 | 12/1984 |
| EP | 0529287 A2 | 3/1993 |
| GB | 2375036 | 11/2002 |
| WO | 2005016098 | 2/2005 |

OTHER PUBLICATIONS

Patents Act 1977: Search Report under Section 17; Dec. 16, 2010. For Application No. GB 1014816.1.

* cited by examiner

PROCESSING APPARATUS AND METHOD

FIELD OF THE INVENTION

The present invention relates to a processing apparatus and method.

BACKGROUND OF THE INVENTION

Processing apparatuses use blade tools to chop, shred, knead, and otherwise process materials, such as food. Typically, the food is introduced to a blade tool in use via a chute with a pusher for pushing the food through the chute. After the blade tool has acted on the food, the food is then stored in a bowl.

SUMMARY OF THE INVENTION

Embodiments of the present invention advantageously provide a processing apparatus with an improved interlock system and blade storage.

An embodiment of the invention includes a processing apparatus which includes a housing, including: a motor, and a drive shaft extending from the housing, the drive shaft being rotatable by the motor about a drive axis, the drive shaft including a drive engagement device being movable along the drive axis between an extended position and a retracted position. The apparatus further includes a bowl including a mouth, the bowl being removably mountable to the housing, the drive shaft extending into the bowl when the bowl is secured to the housing in a working position, a bowl lid removably mountable over the mouth of the bowl, the bowl lid being in a working position when mounted over the bowl, the bowl lid including a chute, a lid shaft mounted on the bowl lid and the chute, the lid shaft including a lid spring configured to be axially aligned with the drive shaft when the bowl and bowl lid are in the working position, and a pusher operable to be moved through the chute, the pusher including a pusher engagement portion for causing the lid spring to move the drive engagement device into the retracted position when the bowl and bowl lid are in the working position. When the drive engagement device is in the retracted position, the drive shaft is rotatable by the motor.

Another embodiment of the invention includes a method of assembling a processing apparatus, the method including: providing a housing, including: a motor, and a drive shaft extending from the housing, the drive shaft being rotatable by the motor about a drive axis, the drive shaft including a drive engagement device being movable along the drive axis between an extended position and a retracted position. The apparatus further includes providing a bowl including a mouth, the bowl being removably mountable to the housing, the drive shaft extending into the bowl when the bowl is secured to the housing in a working position, providing a bowl lid removably mountable over the mouth of the bowl, the bowl lid being in a working position when mounted over the bowl, the bowl lid including a chute, providing a lid shaft mounted on the bowl lid and the chute, the lid shaft including a lid spring configured to be axially aligned with the drive shaft when the bowl and bowl lid are in the working position, and providing a pusher operable to be moved through the chute, the pusher including a pusher engagement portion for causing the lid spring to move the drive engagement device into the retracted position when the bowl and bowl lid are in the working position. When the drive engagement device is in the retracted position, the drive shaft is rotatable by the motor.

Another embodiment of the invention includes a processing apparatus, including: a housing, including: a motor, and a drive shaft extending from the housing, the drive shaft being rotatable by the motor about a drive axis, the drive shaft including a drive engagement means being movable along the drive axis between an extended position and a retracted position. The apparatus further includes means for containing including a mouth, the containing means being removably mountable to the housing, the drive shaft extending into the containing means when the containing means is secured to the housing in a working position, means for covering removably mountable over the mouth of the containing means, the covering means being in a working position when mounted over the containing means, the covering means including a means for a chute, a lid shaft mounted on the covering means and the chute means, the lid shaft including a lid spring configured to be axially aligned with the drive shaft when the containing means and covering means are in the working position, and a pushing means operable to be moved through the chute means, the pushing means including a pusher engagement portion for causing the lid spring to move the drive engagement means into the retracted position when the containing means and covering means are in the working position. When the drive engagement means is in the retracted position, the drive shaft is rotatable by the motor.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures, wherein.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. The progression of processing steps described is an example; however, the sequence of steps is not limited to that set forth herein and may be changed as is known in the art, with the exception of steps necessarily occurring in a certain order.

Figure 1:
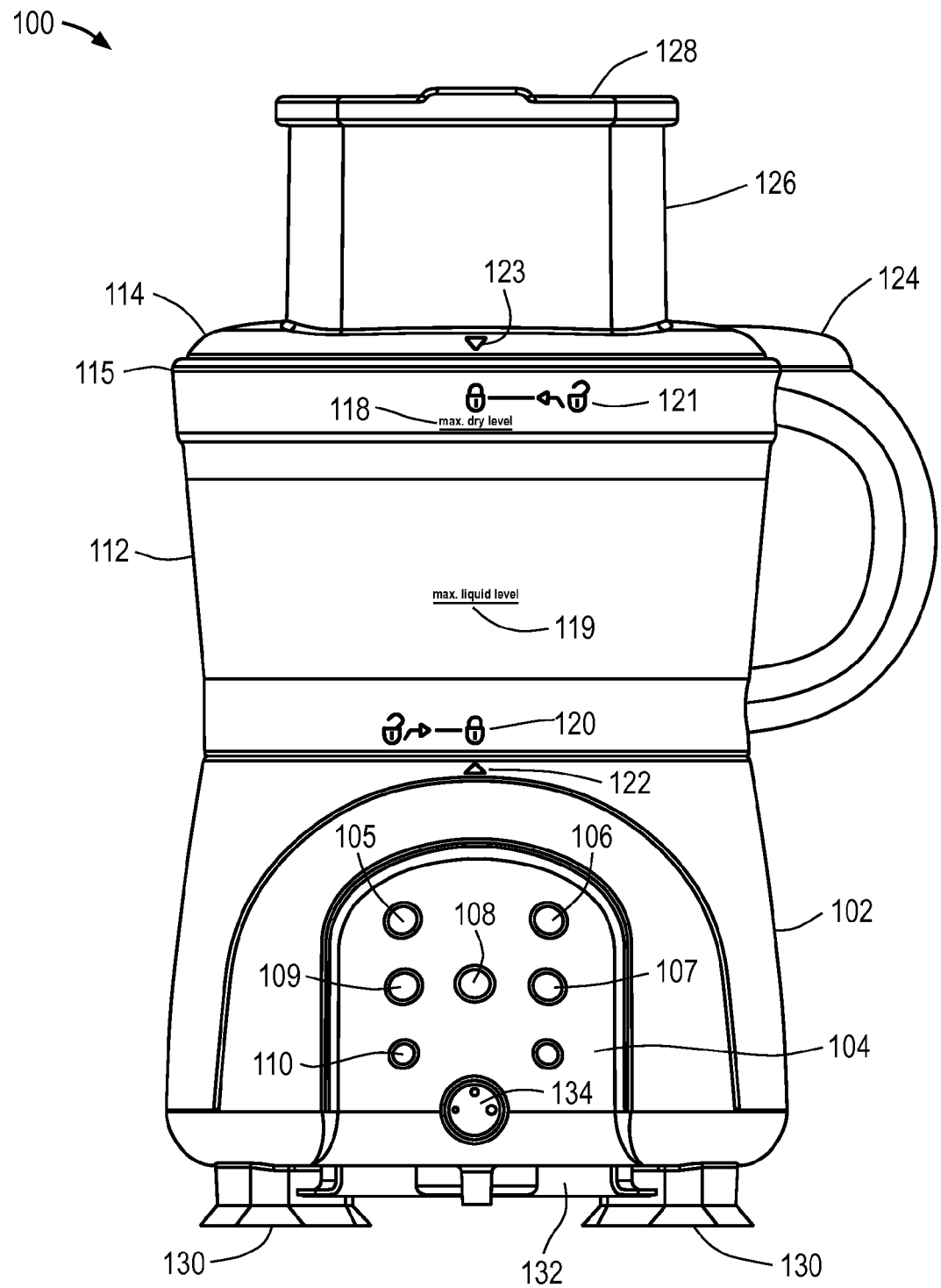
FIG. 1 is a side view of a food processing apparatus in accordance with an embodiment of the present invention.

The invention will now be described with reference to the drawing figures in which like reference numerals refer to like parts throughout. Referring now to FIG. 1, a processing apparatus 100 includes a motor housing 102 which may include a control panel 104 for controlling functions of the apparatus 100. The control panel 104 may include buttons, e.g., buttons 105-110, as a user interface to select the apparatus functions. Such functions may include, without limitation, speed, processing time, pulse, operation type, and power. The control panel 104 may further include a visual indicator (not shown), which may be, for example, a light (e.g., an LED) or a screen (e.g., LCD) for providing information to a user. A bowl 112 may be placed over the motor housing 102. A bowl lid 114 may be placed over the mouth 115 of the bowl 112. The bowl 112 may include a handle 116, first and second level indicators 118, 119 for indicating levels of processed material, and first and second lock indicators 120, 121 for indicating whether the bowl 112 is secured to the motor housing 102 and to the bowl lid 114. A third lock indicator 122 may be located on the motor housing 102 such that, when aligned with a portion of the first lock indicator 120, may inform the user that the bowl 112 is secured to the motor housing 102 and in a working position. A fourth lock indicator 123 may be located on the bowl lid 114 such that, when aligned with a portion of the second lock indicator 121, may inform the user that the bowl lid 114 is secured to the bowl 112 and in a working position. The bowl lid 114 may further include a handle lock 124 for assisting the user in aligning the bowl lid 114 properly on the bowl 112 and a pusher chute 126 for receiving a pusher 128. There may also be a first locking mechanism (not shown) for securing the bowl 112 to the motor housing 102, and a second locking mechanism (not shown) for securing the bowl lid 114 to the bowl 112.

The apparatus 100 may further include feet 130 which may be formed of a material, for example, rubber, which may provide a non-marking base for the apparatus 100. The feet 130 may further be formed to provide a gripping function, e.g., as suction cups, such that the apparatus 100 does not move on its working surface during operation. A cord wrap 132 may be provided to allow an electrical cord 210 (FIG. 2) to be wrapped up when the apparatus 100 is not in use or to shorten the cord 210 when in use. Alternatively, a retractable cord assembly (not shown) may be provided. Decorative items, e.g., logo 134, may be provided for additional information and/or for aesthetic purposes.

Figure 2:
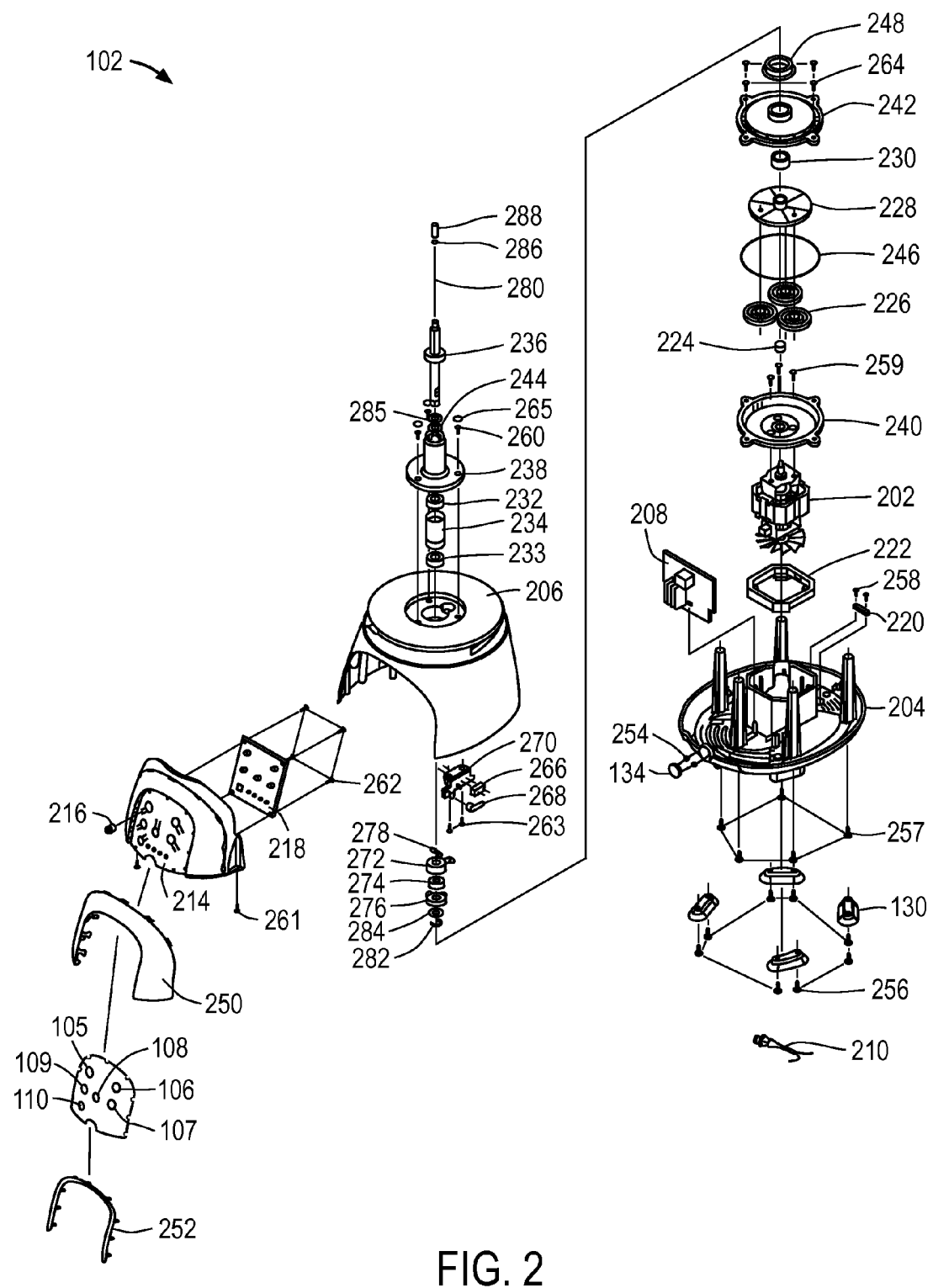
FIG. 2 is an exploded view of a first portion of the food processing apparatus in accordance with an embodiment of the present invention.

FIG. 2 is an exploded view of a first portion of the processing apparatus 100. The motor housing 102 further includes a motor having a drive axis, e.g., a motor assembly 202, and related parts that generate the desired mechanical action. The motor housing 102 can have a base 204 and a body 206. The motor housing 102 may also incorporate electric and/or electronic motor control devices such as a first printed circuit board 208 that, in this example, regulates and interfaces electrical power between a power cord 210 and the motor assembly 202. Also, the FIG. 1 control panel 104 may include user interface and operation elements such as a membrane switch surface 212 which could include operational markings such as labels, embossments, etchings, or equivalent. These markings can correspond with individual controls, buttons and/or indicators contributing to the user interface system, e.g., the buttons 105-110. If desired, information could flow to and from the user through various intermediating elements, such as buttons and lights that in this example are attached to control plate 214 and light cover 216. Signals could flow between the various controls and indicators and a device such as a second printed circuit board 218, which, in this example, creates the appropriate signals for the first printed circuit board 208, causing the desired activity to occur.

The motor housing 102 could also employ at least one suction cups, e.g. a foot 130, that can help secure the apparatus to a work surface. The motor housing 102 could also include supporting hardware such as wire cover 220 that may constrain the power cord 210 in a fixed position inside the motor housing 102.

A motor supporter 222, formed of, e.g., rubber, could contain the motor assembly 202 which could rotate a motor axle gear 224. The motor axle gear 224, in turn, may mesh with a drivetrain assembly that may include at least one gear 226 (e.g., a star gear), a gear bracket 228, a first bushing 230 attached to the gear bracket 228, and a second and third bushing 232, 233 that may be attached to a bushing mount 234. The bushings 230, 232, 233 may be formed of, e.g., bronze. The drivetrain assembly can rotate a drive shaft 236 that could be positioned to be exposed to the exterior of the motor housing 102, and can be supported by a drive shaft mount 238.

One or more parts of the drivetrain assembly may be enclosed or supported by a base gear cover 240, a top gear case 242, and a first washer 244, e.g., a bakelite washer. Various components of the motor housing 102 may also be supported and protected by a sealing ring 246, and a shock circle 248.

There can also be included optional trim elements such as a decorative cover 250, a decorative ring 252, and other decorative items, e.g., the logo 134. The apparatus 100 may be manufactured in an economical and reliable manner, for example, by using various assembly and fastening strategies that could include hardware such as fasteners 254 and screws 256-264. At least some screws, for example, those visible to the user or subject to debris, may be covered by screw covers 265.

The motor housing 102 may also incorporate an interlock system that can permit the apparatus to operate only when it is properly configured. Typically, the interlock system would detect the presence or absence of items necessary for operation. The interlock system may include a motor engagement device, e.g., a microswitch 266, that can restrict electrical power from flowing to the motor assembly 202. Alternatively, a mechanism such as a clutch could also be used for the motor engagement device to disrupt the flow of mechanical energy through the drivetrain assembly.

The microswitch 266 within the interlock system may be actuated by a switch lever 268 that can be supported by a fulcrum bar 270. The switch lever 268 may interface with an action bar 272 that can ordinarily be maintained in a default extended position as a result of pressure applied to the action bar 272 by a first spring 274 supported by a spring mount 276. The action bar 272 may glide against a pin 278 connected to a first lever 280, both of which may be contained within the drive shaft 236. The first lever 280 may be a drive engagement device, and may be located in the drive shaft 236. These items may then convey a common motion between an extended default position and a retracted position, the retracted position only being achievable against the pressure applied by the first spring 274. The first lever 280 may interface with the exterior of the motor housing 102, through the center of the drive shaft 236. This arrangement allows the first lever 280 to convey its extended or retracted position to the microswitch 266. The interlock system may be arranged so the presence of items deemed necessary for the operation of the apparatus causes the first lever 280 to assume its retracted position, allowing the machine to be activated.

The proper orientation of the drive shaft 236 and the interlock mechanism may be maintained by additional hardware such as a fastening collar 282, additional washers 284, 285 and a securing gasket 286. Also, a drive shaft protector 288 may be introduced to ensure that the first lever 280 is only retracted by proper the installation of the items intended to be detected. The drive shaft protector 288 will be described in more detail below with respect to FIG. 5.

Figure 3:
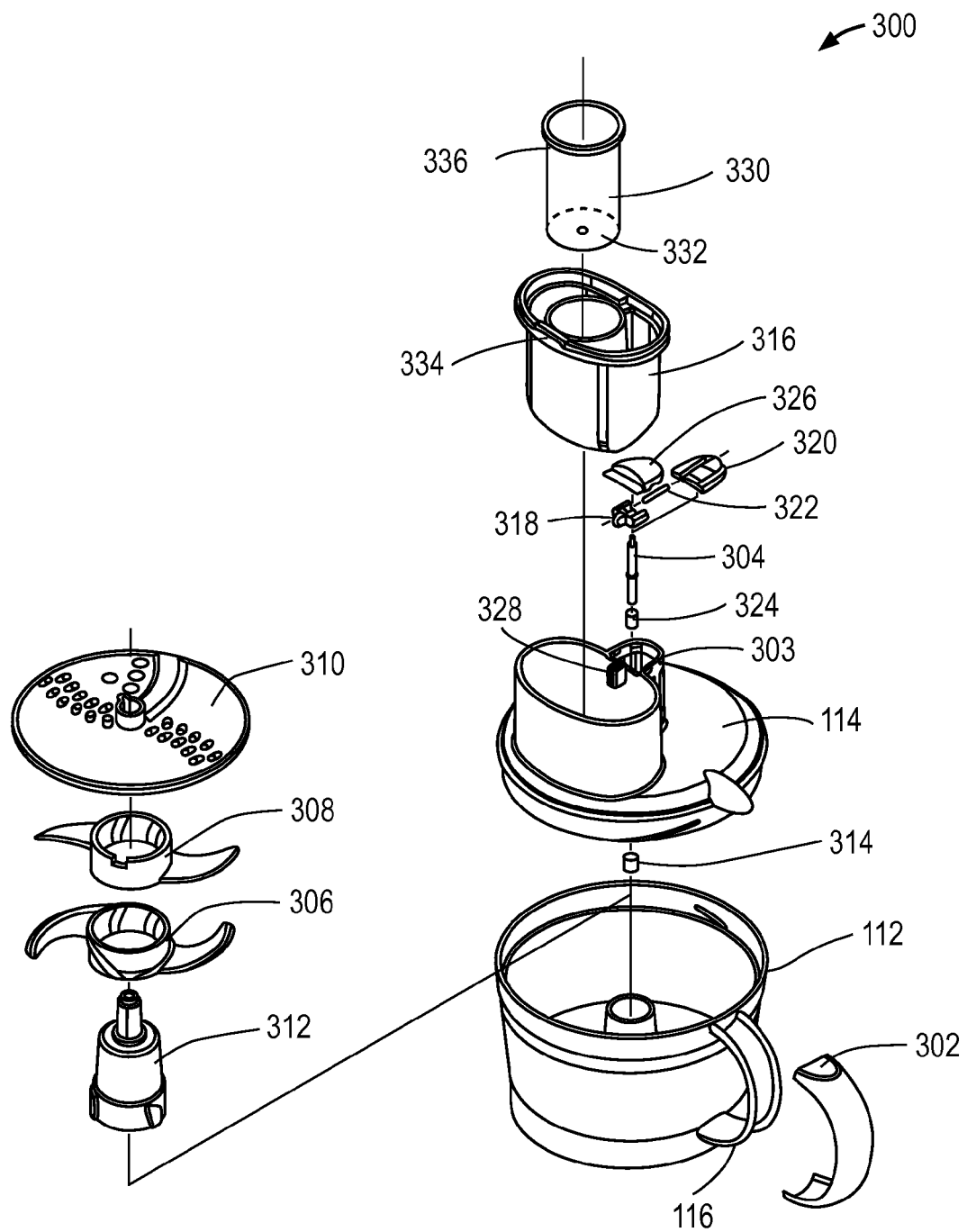
FIG. 3 is an exploded view of a second portion of the food processing apparatus in accordance with an embodiment of the present invention.

Now turning to FIG. 3, a second portion of the apparatus 100 is illustrated. The motor housing 102 (FIGS. 1 and 2) may interface with a container assembly 300 that may include the bowl 112 and a bowl lid 114. The bowl 112 may include the handle 116 that may further include a bowl handle cover 302. The bowl 112 may be constructed so it can fit over the drive shaft 236 (FIG. 2). The bowl lid 114 may include a lid shaft 303 that may house a second lever 304 that retracts the first lever 280 (FIG. 2) only as a result of the proper installation of the bowl 112, bowl lid 114, and any other items required for operation.

The apparatus 100 may further include blade tools 306, 308, 310 that can be positioned inside the bowl 112 on the drive shaft 236 and be rotated as a result of the mechanical action created by the motor housing 102. The blade tools 306, 308, 310 may be reconfigurable and can be selected by the user based on the properties of the material to be processed by the apparatus and the intended results. The blade tools 306, 308, 310 may include a chopping blade 306, a dough blade 308, and a cutter disc 310. One or more of the blade tools 306, 308, 310 may be secured to a blade shaft 312 that may be inserted into the bowl 112 and interfaced with the drive shaft 236. Some of these items may be stabilized by additional hardware such as a fox cap 314.

The blade shaft 312 may include one or more of an active region that can convey mechanical rotation to the inserted blade tools. The blade shaft 312 may also include one or more of an inactive region that could retain a blade tool without rotating it while the machine is otherwise operating or for storage when the apparatus 100 is not in use. This configuration could avoid having to provide exterior storage for unused blades or losing blades that are not in use. In addition, if the apparatus 100 is stored with the bowl lid 114 on the bowl 112 with the blades blade tools 306, 308, 310 in the bowl, accumulation of dust and debris may be averted.

The user may add additional material into the container assembly while the apparatus 100 is operating. The pusher chute 126 may be included with the bowl lid 114, to accept the additional material and the pusher 128. Also, to help the user insert the material, an outer pusher 316 may be provided for use as a tool that the user may insert into the pusher chute 126 to complete the introduction and processing of newly added material.

The installation of the outer pusher 316 may ensure operation of the apparatus, and may protect the user from suffering direct contact with the rotating blade assembly. Therefore, it may be desirable for the interlock to monitor and require the installation of the outer pusher 316. The bowl lid 114 may include an engagement sensor 318 that may be secured by a bracket 320 and that may be maintained in a default extended position through mechanical pressure exerted by a second spring 322. The engagement sensor 318 may be configured so the proper installation of the outer pusher 316 could cause the engagement sensor 318 to interact with a pusher engagement portion 602 (FIG. 6) and an optional pusher engagement portion ramp 604 (FIG. 6) included as part of the outer pusher 316. This action causes the engagement sensor 318 to assume its retracted position against the force of the second spring 322. The engagement sensor 318 also interacts with the second lever 304 that is similarly maintained in a default position through force applied by a lid spring, e.g., a third spring 324, located in the lid shaft 303. As a result, the movements of the engagement sensor 318 and the second lever 304 can be related to the installation of the outer pusher 316. Through motion of the engagement sensor 318 and lid spring (e.g., third spring 324), the lid engagement device (e.g., the second lever 304) may be pushed down, which can move and engage the drive engagement device (e.g., the first lever 280) into the retracted, working, or operable position.

When the outer pusher 316 is inserted into the pusher chute 126, the bowl lid 114 is secured to the bowl 112, and the bowl 112 is secured to the motor housing 102, the apparatus 100 may be in a operable, or working, position. In this position, the lid engagement device (e.g., second lever 304), drive engagement device (e.g., first lever 280), and drive shaft 236 may be axially aligned. The drive engagement device (e.g., first lever 280) may be moved into the retracted position.

One or more of these elements may be protected by a shelter 326 over the engagement sensor 318 and bracket 320. Also, a portion of the engagement sensor 318 may protrude into a lid shaft guide 328 located on the chute 126 to avoid actuation of the engagement sensor 318 by any object other than the pusher engagement portion 602. The pusher engagement portion 602 may move through the lid shaft guide 328, for example, as a rail.

The second lever 304 may be positioned to interact with the first lever 280. This configuration causes the interlock mechanism to only allow the machine to operate as a result of the proper installation of critical elements, such as one or more of the bowl 112, the blade shaft 312, the bowl lid 114, and the outer pusher 316.

The outer pusher 316 may include an inner chute 606 (FIG. 6) that may accept additional material and may accept an inner pusher 330 that may be used as a tool to complete the insertion of material into the inner chute 606. The inner pusher 330 may include a liquid intake port 332 to allow the user to pour fluid, e.g., water, into the container assembly while the apparatus is operating without the need to remove parts and without the risk of the additional fluid splashing out of the machine upon contact with the rotating blade assembly. The inner pusher 330 and the outer pusher 316 may be joined by a pusher locking mechanism 334, 336 so the plurality of pushers may be operated as a single assembly, e.g., the pusher 128 shown in FIG. 1.

Figure 4:
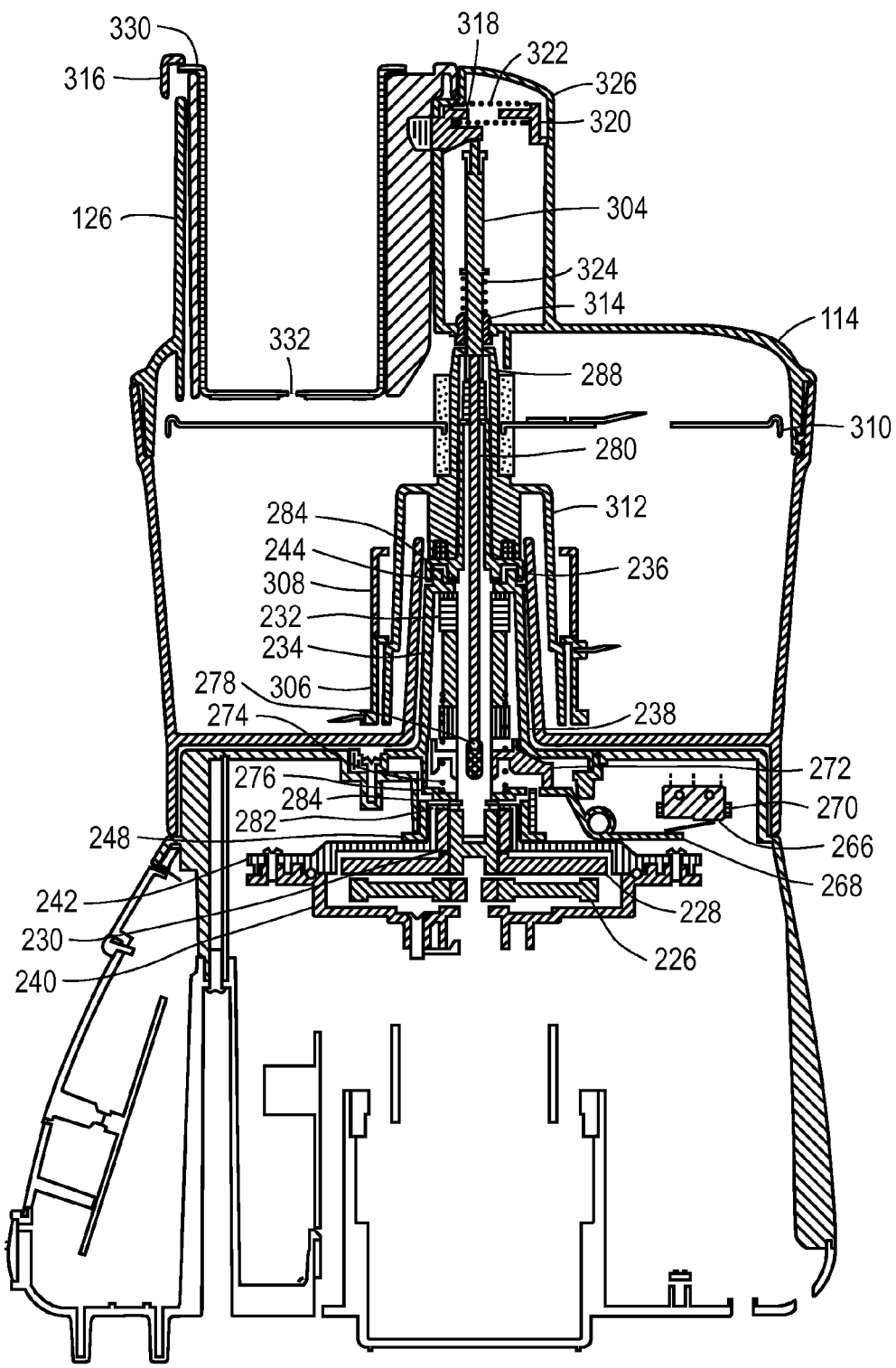
FIG. 4 is a cross-sectional view of a food processing apparatus in accordance with an embodiment of the present invention.

FIG. 4 shows a cross-section of the apparatus 100 such that elements of FIGS. 1-3 are illustrated in their assembled positions. It should be appreciated that, in the configuration shown, the apparatus 100 would be in an operative position, such that the interlock is engaged.

Figure 5:
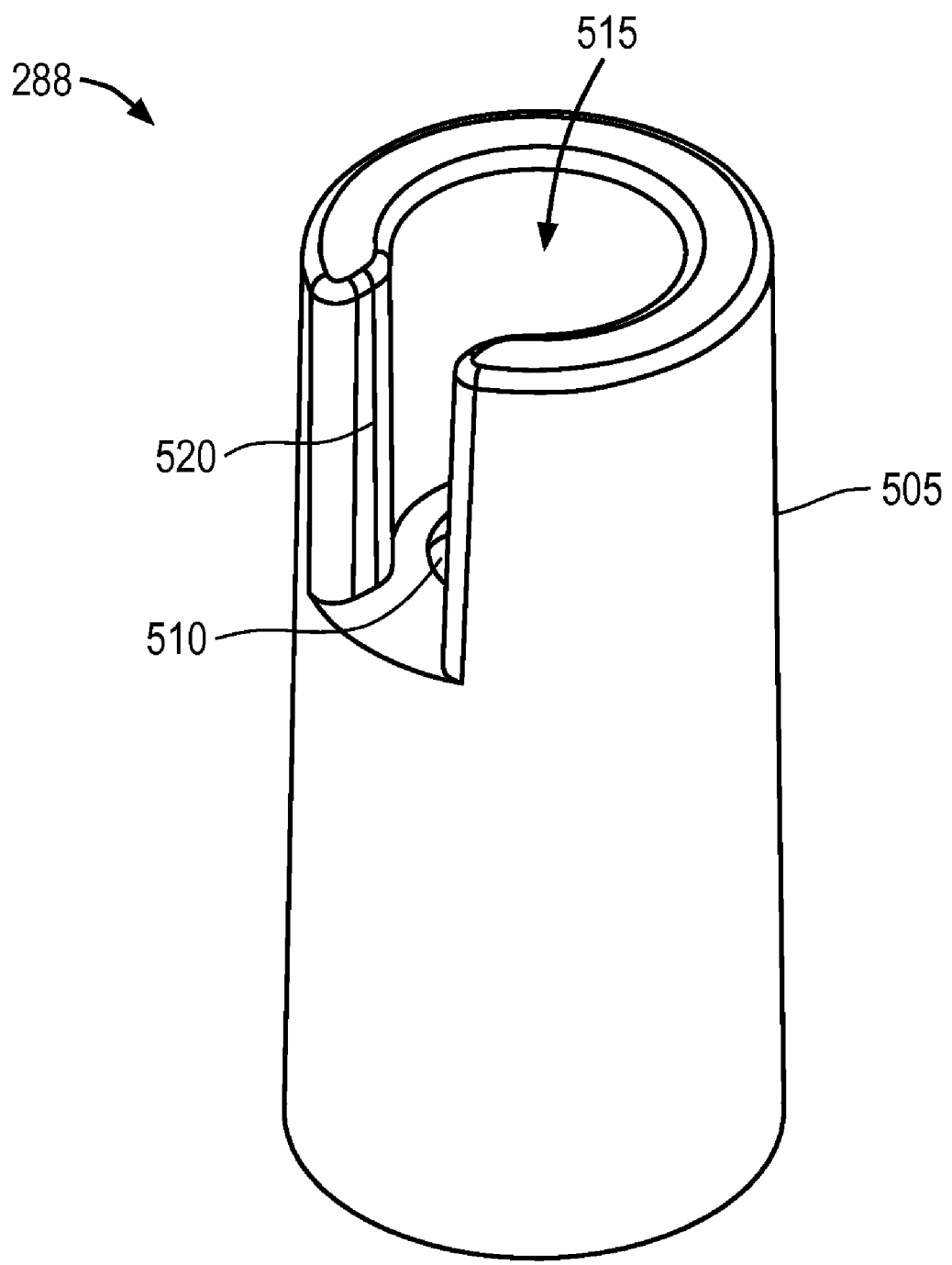
FIG. 5 is a perspective view of a drive shaft protector in accordance with an embodiment of the present invention.

FIG. 5 shows a drive shaft protector 288 for use with the apparatus 100. The drive shaft protector 288 includes a body 505 that fits over an end of the first lever 280. The end of the end of the first lever 280 (FIG. 2) may protrude into the body and be accessible at a hole 515 such that the second lever 304 (FIG. 3) may contact and depress the first lever 280 when the outer pusher 316 is inserted into the chute 126. An optional slot 510 may allow the side of the end of the first lever 280 to be visible inside the drive shaft protector 288, which may in proper placement of the drive shaft protector 288 during assembly.

Figure 6:
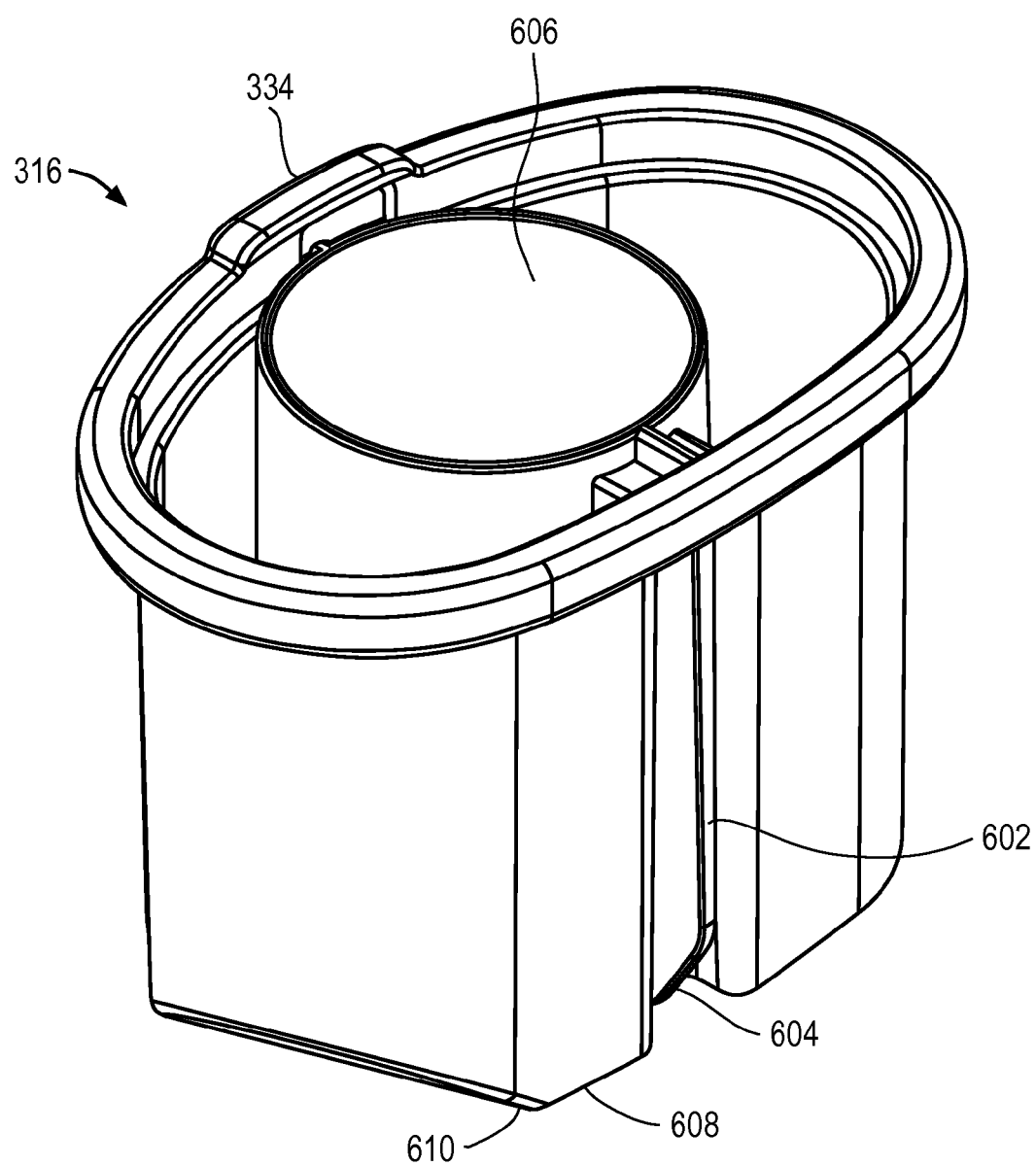
FIG. 6 is a perspective view of a food pusher in accordance with an embodiment of the present invention.

FIG. 6 depicts the outer pusher 316, which includes the aforementioned part of the pusher locking mechanism 334, the pusher engagement portion 602, the optional pusher engagement portion ramp 604, and the inner chute 606. The outer pusher 316 also has a bottom surface 608 that includes an angled portion 610. The angle of the angled portion 610 may be nonperpendicular to the drive axis. A nonlimiting example of an angle of the angled portion 610 may be 30-40° from a horizontal axis, or 50-60° from the drive axis. The angled portion 610 may also have an angle where it meets the remainder of the bottom surface 608, e.g., 30°. During operation of the apparatus 100, when the outer pusher 316 is inserted into the pusher chute 126, the angled portion 610 generates an effect to force material that may stick to the outer pusher 316 or to the side of the pusher chute 126 through the blade tool in use (e.g., any of blade tools 306, 308, 310) and into the bowl 112.

Embodiments of the a processing apparatus may include other functions. For example, a temperature control system, such as an ice vessel or heating device, may be provided. Such a temperature control system may help to maintain food.

An overflow switch may shut off machine, e.g., in case of foaming or pressure buildup. In one embodiment, the switch may be attached to the engagement sensor 318. An overflow spout can direct the exit path of material that exceeds the capacity of the container. Embodiments may also include an automatic cleaning capability that allows the user to operate the machine while intentionally overfilling the container assembly with water or other cleaning material, causing it to exit through the overflow spout, thereby cleaning the parts of the apparatus that ordinarily interact with the material it is processing. An automatic drying capability, possibly used after the automatic cleaning cycle, may eliminate or expel most of the remaining water or cleaning material from the machine, such as by centrifugal action, airflow, heat, or similar activity involved with the apparatus's operation An air intake control port can affect the results of the material being processed. This could be used for achieve specific results, such as in making whipped cream, shaving cream, or to condition dough or batter to control the fluffiness of the subsequently baked or cooked product.

A serving or portioning mode may be provided in which the apparatus is operated in conjunction with the air intake, causing the air to displace contained material and a controlled amount of material to intentionally be discharged through the overflow spout. This could be used, for example, to allow the material within the apparatus to be distributed for individual consumption.

Embodiments include color coding of various parts, e.g., the blade tools 306, 308, 310, for easy reconfiguration and identification. Additional embodiments of the invention may include an inverted design such that the motor housing 102 is located at the top of the apparatus and is installed suspended, for example, from under a kitchen counter or cabinet.

Further embodiments include an ice cream cycle, which may be a program mode to make ice cream and other frozen desserts. A power cord adapter may be provided which may include, for example, a specially flattened region to allow the entire unit to be placed inside an ordinary freezer such that the flattened region of the power cord may be positioned across the existing freezer door seal gasket to allow the freezer door to close and the freezer operate normally.

Embodiments may include a temperature sensor (e.g., a thermometer, thermocouple, or thermistor) for measuring the temperature of processed material for use as part of the some modes of the control algorithm. The temperature sensor may be used with the aforementioned temperature control system or for processes and recipes requiring the real-time temperature to be considered when making control decisions.

It should be appreciated that, although the material to be processed is often discussed as "food," other materials may be processed. Further, the materials described herein for forming various items of the apparatus 100 are not intended to be limiting, and are only provided as examples.

The processes and devices in the above description and drawings illustrate examples of only some of the methods and devices that could be used and produced to achieve the objects, features, and advantages of embodiments described herein. Thus, they are not to be seen as limited by the foregoing description of the embodiments, but only limited by the appended claims. Any claim or feature may be combined with any other claim or feature within the scope of the invention.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A processing apparatus, comprising:
  a housing, comprising:
    a motor; and
    a drive shaft extending from the housing, the drive shaft being rotatable by the motor about a drive axis, the drive shaft comprising a drive engagement device being movable along the drive axis between an extended position and a retracted position;
  a bowl including a mouth, the bowl being removably mountable to the housing, the drive shaft extending into the bowl when the bowl is secured to the housing in a working position;
  a bowl lid removably mountable over the mouth of the bowl, the bowl lid being in a working position when mounted over the bowl, the bowl lid comprising a chute;
  a lid shaft mounted on the bowl lid and the chute, the lid shaft comprising a lid engagement device configured to be axially aligned with the drive shaft when the bowl and bowl lid are in the working position; and
  a pusher operable to be moved through the chute, the pusher comprising a pusher engagement portion for causing the lid engagement device to move the drive engagement device into the retracted position when the bowl and bowl lid are in the working position, wherein, when the drive engagement device is in the retracted position, the drive shaft is rotatable by the motor.

2. The processing apparatus of claim 1, wherein the pusher further comprises a bottom surface for contacting material to be processed, the bottom surface comprising a portion at an angle nonperpendicular to the drive axis.

3. The processing apparatus of claim 2, wherein angle of the portion of the bottom surface is configured to generate an effect during operation of the apparatus to remove material from the pusher or the chute.

4. The processing apparatus of claim 1, wherein the housing further includes a motor engagement device for engaging the motor when the motor engagement device is engaged by the drive engagement device.

5. The processing apparatus of claim 4, wherein the motor engagement device comprises a switch.

6. The processing apparatus of claim 4, wherein the motor engagement device comprises a clutch.

7. The processing apparatus of claim 1, further comprising a lid shaft guide mounted on the chute for guiding a position of the pusher engagement portion.

8. The processing apparatus of claim 7, wherein the lid shaft further comprises an engagement sensor for sensing whether the pusher engagement portion is in an operative position.

9. The processing apparatus of claim 8, wherein, when the engagement sensor senses that the pusher engagement portion is in an operative position, the engagement sensor is operable to move the lid engagement device to move the drive engagement device into the retracted position.

10. The processing apparatus of claim 1, further comprising a plurality of blade attachments for processing material.

11. The processing apparatus of claim 10, wherein all of the plurality of blade attachments are capable of being stored on the drive shaft.

12. The processing apparatus of claim 10, wherein, when one of the plurality of blade attachments is in use for processing material, the remaining blade attachments are capable of being stored on the drive shaft.

13. The processing apparatus of claim 12, wherein the stored blade attachments are loosely stored on the drive shaft such that the drive shaft is capable of being rotated without engaging the stored blade attachments to process material.

14. The processing apparatus of claim 1, further comprising a lid spring for moving the lid engagement device.

15. The processing apparatus of claim 1, further comprising a drive shaft protector fitted over an end of the drive engagement device.

16. A processing apparatus, comprising:
a housing, comprising:
  a motor; and
  a drive shaft extending from the housing, the drive shaft being rotatable by the motor about a drive axis, the drive shaft comprising a drive engagement means being movable along the drive axis between an extended position and a retracted position;
means for containing including a mouth, the containing means being removably mountable to the housing, the drive shaft extending into the containing means when the containing means is secured to the housing in a working position;
means for covering removably mountable over the mouth of the containing means, the covering means being in a working position when mounted over the containing means, the covering means comprising a means for a chute;
a lid shaft mounted on the covering means and the chute means, the lid shaft comprising a lid engagement means configured to be axially aligned with the drive shaft when the containing means and covering means are in the working position; and
a pushing means operable to be moved through the chute means, the pushing means comprising a pusher engagement means for causing the lid engagement means to move the drive engagement means into the retracted position when the containing means and covering means are in the working position,
wherein, when the drive engagement means is in the retracted position, the drive shaft is rotatable by the motor.

17. The processing apparatus of claim 16, wherein the pushing means further comprises a bottom surface for contacting material to be processed, the bottom surface comprising a portion at an angle nonperpendicular to the drive axis.

18. The processing apparatus of claim 17, wherein the angle of the portion of the bottom surface is configured to generate an effect during operation of the apparatus to remove material from the pushing means or the chute means.

19. The processing apparatus of claim 16, wherein the housing further includes a motor engagement means for engaging the motor when the motor engagement means is engaged by the drive engagement means.

20. The processing apparatus of claim 19, wherein the motor engagement means comprises a switch.

21. The processing apparatus of claim 19, wherein the motor engagement means comprises a clutch.

22. The processing apparatus of claim 16, further comprising a lid shaft guide means mounted on the chute means for guiding a position of the pusher engagement means.

23. The processing apparatus of claim 22, wherein the lid shaft further comprises an engagement sensing means for sensing whether the pusher engagement means is in an operative position.

24. The processing apparatus of claim 23, wherein, when the engagement sensing means senses that the pusher engagement means is in an operative position, the engagement sensing means is operable to move the lid engagement means to move the drive engagement means into the retracted position.

25. The processing apparatus of claim 16, further comprising a plurality of blade means for processing material.

26. The processing apparatus of claim 25, wherein more than of the plurality of blade means are capable of being stored on the drive shaft at the same time.

27. The processing apparatus of claim 25, wherein, when one of the plurality of blade means is in use for processing material, the remaining blade means are capable of being stored on the drive shaft.

28. The processing apparatus of claim 27, wherein the stored blade means are loosely stored on the drive shaft such that the drive shaft is capable of being rotated without engaging the stored blade means to process material.

29. The processing apparatus of claim 16, further comprising a lid spring means for moving the lid engagement means.

30. The processing apparatus of claim 16, further comprising a drive shaft protector fitted over an end of the drive engagement device.

* * * * *